Jan. 23, 1973      W. R. EARGLE, JR      3,712,981

LIGHTING FIXTURE U-BENT FLUORESCENT LAMPS

Filed Nov. 28, 1969

INVENTOR
William R. Eargle, Jr.
BY
ATTORNEY

United States Patent Office 3,712,981
Patented Jan. 23, 1973

3,712,981
LIGHTING FIXTURE FOR U-BENT FLUORESCENT LAMPS
William R. Eargle, Jr., Vicksburg, Miss., assignor to Westinghouse Electric Corporation, Pittsburgh, Pa.
Filed Nov. 28, 1969, Ser. No. 880,841
Int. Cl. H05b 33/02
U.S. Cl. 240—51.12                            9 Claims

ABSTRACT OF THE DISCLOSURE

A lighting fixture for use with fluorescent U-bent lamps in which the lamp holder or electrical socket is mounted at an angle with respect to a vertical plane through the lighting fixture in order that the U-bent lamps are mounted at an angle with respect to the fixture to thereby place the higher light output, U-bent end of the lamp a greater distance from the refractor than the open or mounting pin end of the lamp.

BACKGROUND OF THE INVENTION

This invention relates to fluorescent lighting fixtures and more particularly to fluorescent lighting fixtures for use with U-bent fluorescent lamps.

It has been the accepted practice for years in the lighting industry to mount straight fluorescent lamps horizontally within the lighting fixture. The symmetry of the elongated straight fluorescent lamp gives uniform illumination on the refractor or shielding media. When a U-bent lamp is mounted in a standard fixture behind a plastic or glass refractor or shield there is a decided variation of light level appearing on the face of the refractor from the open, lamp pin end, of the U-bent fluorescent lamp to the U-bent end of the lamp. This variation appears as a dark gray area on the pin end of the fixture and a bright area on the other end. One method by which this undesirable appearance phenomenon can be obviated is to substantially increase the depth of the fixture thus permitting the fluorescent tube to be mounted a substantial distance above the shielding media. Providing this increased depth of fixture to overcome the light variation results in the use of excessive fixture material, requires a deeper plenum area in the building space and reduces the efficiency of the fixture in terms of light output. An additional handicap to providing an increased fixture depth is that when ballast components are placed above the fixture in the conventional manner the depth of the fixture becomes further increased and thus a substantially greater space in the plenum above the ceiling of the room is required for the light fixture.

SUMMARY OF THE INVENTION

It is an object of this invention to provide a lighting fixture for fluorescent U-bent lamps in which the light level across the fixture refractor is substantially uniform.

Another object of this invention is to provide a fluorescent lighting fixture for U-bent fluorescent lamps which evidences a substantially uniform light level across the fixture refractor without an increase in fixture depth.

A further object of this invention is to provide a lighting fixture for fluorescent U-bent lamps which includes a ballast component compartment within the main fixture cavity without increasing fixture depth.

The foregoing objects and others are accomplished in accordance with the present invention by providing in a fluorescent lighting fixture for use with fluorescent U-bent lamps; a troffer having a top wall and downwardly directed substantially vertical side walls which define an open bottomed enclosure, a refractor substantially parallel with said top wall closing off the open bottom of said enclosure and means for mounting a pair of lampholders for each U-bent fluorescent lamp to be accommodated by the fixture whereby U-bent fluorescent lamps mounted in said lampholders will be disposed at an angle with respect to the top wall and the refractor. The fixture of this invention further includes means between the top wall of said fixture and the parallel refractor for mounting the ballast components adjacent the lampholders.

BRIEF DESCRIPTION OF THE DRAWINGS

The above described objects, and others, along with many of the attendant advantages of the present invention will become more readily apparent and better understood as the following detailed description is considered in connection with the accompanying drawing in which.

DESCRIPTION OF THE PREFERRED EMBODIMENTS

Figure 1:
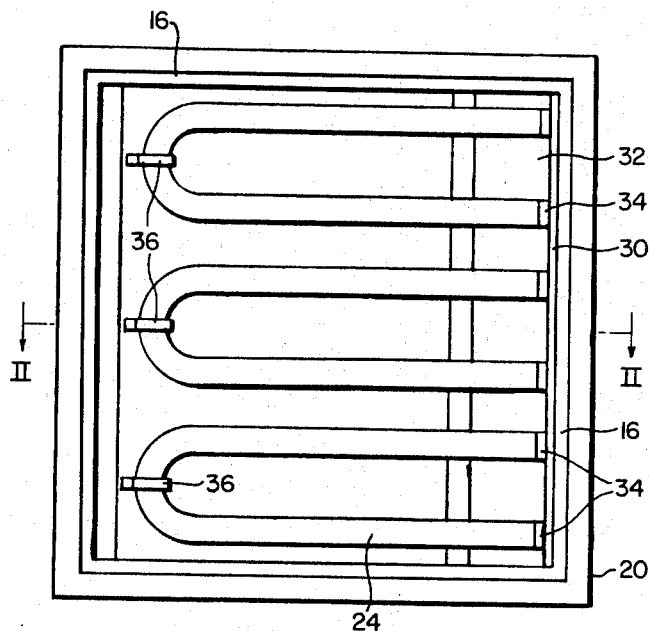
FIG. 1 is a bottom plan view of a lighting fixture for U-bent fluorescent lamps constructed in accordance with the present invention and with the refractor component removed.

Referring now in detail to the drawings wherein like reference characters represent like parts throughout the several views, there is illustrated in FIG. 1 a bottom or room view of a fluorescent lighting fixture for U-bent fluorescent lamps constructed in accordance with the present invention. As may be best seen in FIG. 2, the troffer is formed from stamped sheet metal, either steel or aluminum, and is formed to include a top wall 12 and downwardly directed side walls 14. The side walls 14 may optionally be provided wtih laterally directed flanges 16 which may serve when suitably slotted for air supply or air return through the fixture as desired. At right angles to the flange 16 and parallel to the side walls 14 is an inverted T-shaped flange 18 with the flat bottom 20 which serves to mount the lay-in type fixture on the flanges of the conventional inverted T-shaped ceiling runners employed to support modern day lay-in type ceilings. The interiorly directed portion of the inverted T-shaped member 18 serves to support a lay-in type refractor or shielding means 22. Alternatively, of course a conventional hinged and latched door could be employed as the refractor carrying troffer closure.

Figure 2:
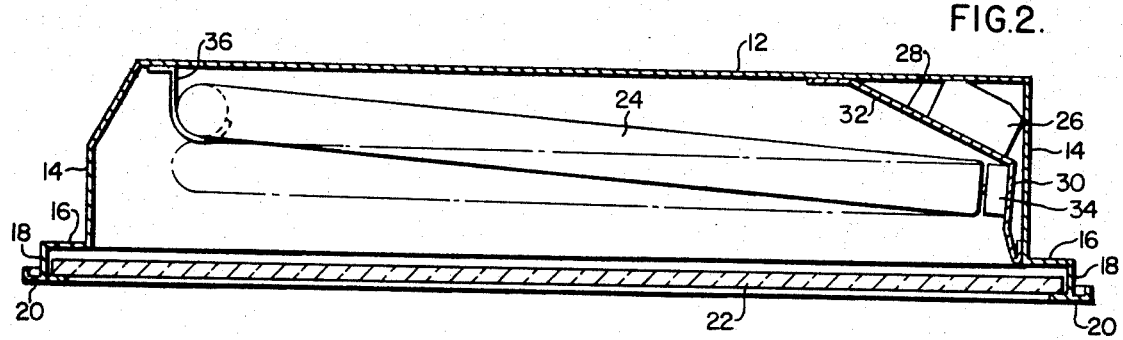
FIG. 2 is a sectional view taken along the line II—II of FIG. 1 with the refractor component in place.

Prior art U-bent fluorescent lamps were conventionally mounted as illustrated in phantom in FIG. 2 between the top wall 12 and the refractor 22 substantially parallel with the refractor. In this mode the light level at the U-bent end of the lamp was substantially greater than the light level at the pin end of the lamp. As can be readily seen in FIG. 1 a substantially greater area of tubular lamp surface is located at that end of the lamp.

Instead of the fluorescent tube being mounted substantially equidistant along its length between the top member 12 which serves as a reflector and the refractor 22, the lamp, in accordance with the present invention, is mounted at its base or pin end slightly closer to the refractor and is tilted at an angle upwardly so that the U-bent end of the lamp is substantially closer to the top wall 12. As a specific example, in a standard 30″ x 30″ fixture with a fixture depth of about 5 inches the lamps are tilted with respect to the horizontal at an angle of about 7 degrees.

In order to further reduce the height or vertical dimension of the lighting fixture the ballast components 26 have been moved from their conventional position in a separate compartment above the top wall or reflector 12 to a corner of the fixture adjacent the side where the pin end of the lamp is located. More particularly a ballast cover and lampholder support 28 is secured to one side wall 14 and the top wall 12 as illustrated in FIG. 2 essentially cutting off the upper corner of the interior of the fixture above the open end of the lamps to form a ballast compartment. The ballast cover and lampholder support 28 which is connected between the bottom of one of the end walls 14 and the top wall 12 comprises essentially two sectors. A first sector 30 which substantially parallels the end wall 14 which is slightly skewed with respect thereto and upon which is mounted the lampholders or sockets 34 into which the pin ends of the fluorescent lamps are mounted. The second sector 32 serves to support and cover the ballast components 26. As will be apparent with this configuration substantially shorter electrical wiring may be employed to connect the ballast to the lamp sockets 34 since all of the electrical components are adjacent one side of the fixture.

The slightly skewed position of the portion 30 of the ballast cover and lampholder support causes lamps mounted in the lampholders 34 to lie within the fixture at a predetermined angle with respect to the horizontal and permits the U-bent end of the lamp to be positioned a greater distance from the refractor 22 than the pin end of the lamp thus permitting an equilization of the light received by the refractor 22.

Although the lamp pin and socket connection should be suitable in most instances to maintain the lamp at its tilted position with respect to the horizontal, to insure the maintenance of this position and for reasons of safety a leaf spring support clip 36 adapted to support the U-bent end of the lamp may be secured to the fixture adjacent that end of the lamp. In the embodiments illustrated the spring clip support member 36 is secured to the underside of top wall 12.

Figure 3:
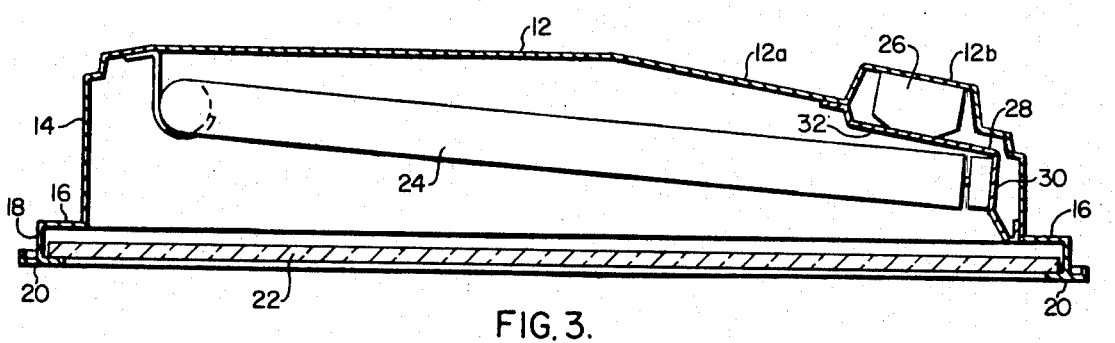
FIG. 3 is a sectional view similar to FIG. 2 illustrating a modified embodiment of the present invention.

The embodiment of FIG. 3 is substantially identical with the FIG. 2 embodiment with the exception that the ballast cover and lampholder support is provided with a greater angle between the portions 30 and 32 thus permitting the ballast support portion 32 to lie in a plane which is more nearly horizontal. In this configuration it should also be noted that the top wall 12 does not lie in a single plane but rather includes a portion 12a which slants with respect to the horizontal to bring the interior reflective surface thereof closer to the lamp 24 and is also provided with a compartment like portion 12b which serves, in conjunction with portion 32 of the ballast cover and lampholder support to form a compartment for the ballast components 26. It should be noted however that even in the configuration of FIG. 3 that the ballast compartment formed by portion 12b of the top wall and portion 32 of the ballast cover and lampholder does not extend above the plane of the main top wall portion 12 and hence does not increase the vertical height of the fluorescent fixture.

As will be apparent from the foregoing, the lighting fixture of the present invention provides for the utilization of U-bent fluorescent lamps in a manner which eliminates the tendency of these fixtures to be brighter at the U-bent end of the lamp and darker at the mounting pin end of the lamp. It should further be noted that the fixture of this invention provides for the foregoing uniform illumination of the refractor without requiring an increase in fixture depth.

I claim as my invention:

1. A lighting fixture for use with fluorescent U-bent lamps comprising:
    a troffer having a top wall and downwardly directed substantially vertical side walls defining an open bottom enclosure,
    a refractor closing off the open bottom of said enclosure and lying in a plane substantially parallel to the plane of said top wall;
    a ballast cover and lampholder support connected between said top wall and one side wall to define a ballast cavity; and
    a pair of lampholders for each U-bent fluorescent lamp to be accommodated by said fixture, said lampholders being mounted on a portion of said ballast cover and lampholders support which is skewed with respect to a vertical plane through the fixture so that the U-bent end of fluorescent lamps mounted in said fixture are a greater distance from said refractor than the open ends of said lamps causing the light intensity of said lamps at said refractor to be substantially uniform throughout.

2. A lighting fixture according to claim 1 wherein support means are positioned within said fixture at the end opposite said lampholders to support the U-bent end of fluorescent lamps mounted in said lampholders.

3. A lighting fixture according to claim 2 wherein said support means are hook shaped and are connected to the underside of said top wall.

4. A lighting fixture for use with fluorescent U-bent lamps comprising:
    a troffer having a top wall and downwardly directed side walls defining an open bottom enclosure,
    shielding means closing off said open bottom of said enclosure and lying in a plane substantially parallel to a plane through said troffer top wall; and
    means for mounting at least one U-shaped fluorescent lamp within said troffer between said top wall and said shielding means in a plane which lies at an angle with respect to the horizontal planes of said troffer top wall and said shielding means with the closed end of said lamp closer to said top wall than to said shielding means and the open end of said lamp closer to said shielding means than to said top wall.

5. A lighting fixture according to claim 4 wherein said means for mounting at least one U-shaped fluorescent lamp includes a lampholder support portion which is adjacent and angularly disposed with respect to one of said downwardly directed side walls to thereby cause said angular relationship between the planes of said top wall and parallel shielding means and a U-bent fluorescent lamp mounted within said fixture.

6. A lighting fixture according to claim 5 wherein said means for mounting at least one U-shaped fluorescent lamp further includes a ballast support portion which, in conjunction with a portion of said top wall and a portion of said one downwardly directed side wall, forms a ballast compartment.

7. A lighting fixture according to claim 4 wherein support means are positioned within said fixture at an end opposite said means for mounting at least one U-shaped fluorescent lamp to support the U-bent end of a fluorescent lamp mounted within said fixture.

8. A lighting fixture according to claim 7 wherein said support means is a leaf spring having a hook shaped configuration adapted to receive and support a tubular fluorescent lamp cross-section.

9. A lighting fixture for use with fluorescent lamps of the U-bent type, wherein each said lamp comprises two spaced end members adapted for lamp support and electrical contact with the remainder of said lamp having a U-shaped configuration lying in a plane, said fixture comprising:
    a troffer having a top wall and downwardly directed side walls defining an open-bottomed enclosure;
    a generally planar refractor member mounted on said troffer side walls and closing off the open bottom of said troffer, and said fixture adapted to be mounted with said refractor disposed in a generally horizontal orientation;
    means for supporting and electrically connecting the end members of at least one said U-bent fluorescent lamp within said troffer proximate one side wall of said troffer with said spaced end members substantially equidistant from said refractor, and with said U-shaped lamp portion supported in a plane which is tilted slightly upward from the plane in which said refractor lies rendering the light intensity at said refractor substantially uniform beneath said lamp.

References Cited

UNITED STATES PATENTS

| 2,625,646 | 1/1953 | Goebel | 240—51.12 X |
| 1,940,872 | 12/1933 | Marbury | 240—11.4 X |
| 2,610,289 | 9/1952 | Brainerd | 240—11.4 |
| 3,198,942 | 8/1965 | DiLello et al. | 240—51.11 X |
| 3,202,814 | 8/1965 | Ceglia | 240—51.11 X |

FOREIGN PATENTS

| 1,066,156 | 10/1959 | Germany | 240—51.11 |

JAMES J. GILL, Primary Examiner